United States Patent [19]

Behr

[11] 4,185,901
[45] Jan. 29, 1980

[54] READING DEVICE

[75] Inventor: Karl-Günter Behr, Biebertal, Fed. Rep. of Germany

[73] Assignee: Minox GmbH, Giessen, Fed. Rep. of Germany

[21] Appl. No.: 849,898

[22] Filed: Nov. 9, 1977

[30] Foreign Application Priority Data

Nov. 10, 1976 [DE] Fed. Rep. of Germany ....... 2651219

[51] Int. Cl.$^2$ ..................... G03B 21/60; G03B 23/08; G03B 21/28
[52] U.S. Cl. ................................ 353/27 R; 350/127; 353/78; 353/81
[58] Field of Search ..................... 353/27 R, 26 R, 74, 353/81, 77, 78; 350/127

[56] References Cited
U.S. PATENT DOCUMENTS

| 2,934,998 | 5/1960 | Beard | 350/127 |
| 3,319,517 | 5/1967 | Rondas | 353/26 R |

Primary Examiner—Steven L. Stephan
Attorney, Agent, or Firm—Hane, Roberts, Spiecens & Cohen

[57] ABSTRACT

A reading device for viewing microfilms, transparencies, fiches, and the like, comprising a plate-shaped projection screen made of transparent material supported on a frame structure with the projection screen disposed in a slanted position relative to the horizontal. The screen has on the viewing side a frosted surface and on the opposite side prism-shaped parts. A source of light is disposed into the frame structure beneath a carrier for placing an article to be projected thereon. A mirror assembly is disposed in the frame structure to reflect light rays passed from the light source through the article to the prism-shaped parts and through the projection screen. The prism-shaped parts are disposed in lengthwise rows and have prism surfaces extending at an angle with respect to the opposite side of the projection screen for deflecting the light rays reflected from the mirror assembly so as to project an image of the article within an angle converging toward a viewer situated above and in front of the screen. The prism surfaces progressively increase from the lower end of the screen through the upper end of the screen to provide substantially uniform illumination.

8 Claims, 4 Drawing Figures

READING DEVICE

The present invention relates to a reading device as being used for viewing microfilms, positive or negative slides etc., and more particularly to the projection screen of such device.

BACKGROUND

Reading devices of the above referred to type and particularly reading devices which are portable and may be placed upon a desk comprise a projection screen in the shape of a plate having a frosted surface on one side. With devices as now known, such plate is vertically or approximately vertically mounted to present to an observer a screen picture which is as uniformly illuminated as possible. However, with an optical system of the kind here involved, the projection assembly producing light rays impinge upon the side of the screen opposite to the frosted side and are dispersed at the level of the frosted side thereof. Accordingly, if the screen and the vertical side thereof is substantially vertically disposed the largest light component in the dispersed light rays impinges upon the eyes of the observer but from the margin of the projected picture, depending upon the observation angle, only the deflected light ray components reaches the eyes of the observer. As a result, the projection as seen by the observer on the screen appears at its margin and is considerably darkened.

To handle the reading device in a convenient manner, the microfilm or fiche is disposed below the screen plate. Accordingly, observation of the picture as appearing on the screen requires continuous stiff and vertical holding of the head of the observer. Such stiff holding of the head is obviously tiring or even painful, especially if the observer wants to make written notes on the table upon which the reading device is placed. Such written notes are often required due to the nature of the information obtained from viewing the screen. Working under such conditions is made even more inconvenient if as is usually the case with reading devices as now known are rather voluminous and occupy most of the table.

Due to the afore pointed out disadvantages of reading devices in which the light rays are directed upon the rear side of the projection screen reading devices are also used to provide impingement of the light rays upon the upper side of a horizontally disposed screen. However, reading devices of this type have the disadvantage that the observer can view the screen only at an angle. Moreover, due to the placement of the mirror system above the screen the device is bound to be very bulky and the mirrors tend to become dusty rather soon thereby reducing the clarity of the projection.

As is apparent, both types of now known reading devices as hereinbefore described have advantages and disadvantages.

THE INVENTION

It is a broad object of the invention to provide a novel and improved reading device which combines the advantages of the afore described reading devices witout the disadvantages thereof.

SUMMARY OF THE INVENTION

The optical problem of combining the advantages of the two types of devices but avoiding the disadvantages is that when the projection with a device based on illumination through a screen plate placed in a substantially horizontal position is that the picture as visible on the screen is considerably darkened when viewed from an angle relative to the plate, especially at the upper part of the projected picture. The extent of such darkening depends on the light ray capability at the edges of a screen having a frosting on one side. If this capability is low, only components of light rays which have a minimum of light will reach the eyes of the observer, that is, only components resulting from brighter light rays will reach the eyes of the observer.

A reading device in accordance with the invention solves the problem by providing before and/or behind the level of the frosted surface of the screen adjacent thereto rows of prisms or wedges of glass or other suitable material such as synthetic plastic material and preferably disposing the same so that the slant of the surfaces of the prisms or wedges are increased from near the lower edge of a slanted screen toward the upper lengthwise edge of the screen.

Such disposition and shaping of the prisms or wedges permits construction of a more compact and relatively lower reading device than heretofore known.

Further objects, features and advantages will be pointed out hereinafter and set forth in the appended claims.

BRIEF DESCRIPTION OF THE INVENTION

In the accompanying drawing embodiments of the invention are shown by way of illustration and not by way of limitation. In the drawing:

FIG. 1 shows a diagrammatic elevational view of a prior art reading device of one of the types herein referred to;

DETAILED DESCRIPTION OF THE INVENTION

Figure 1:
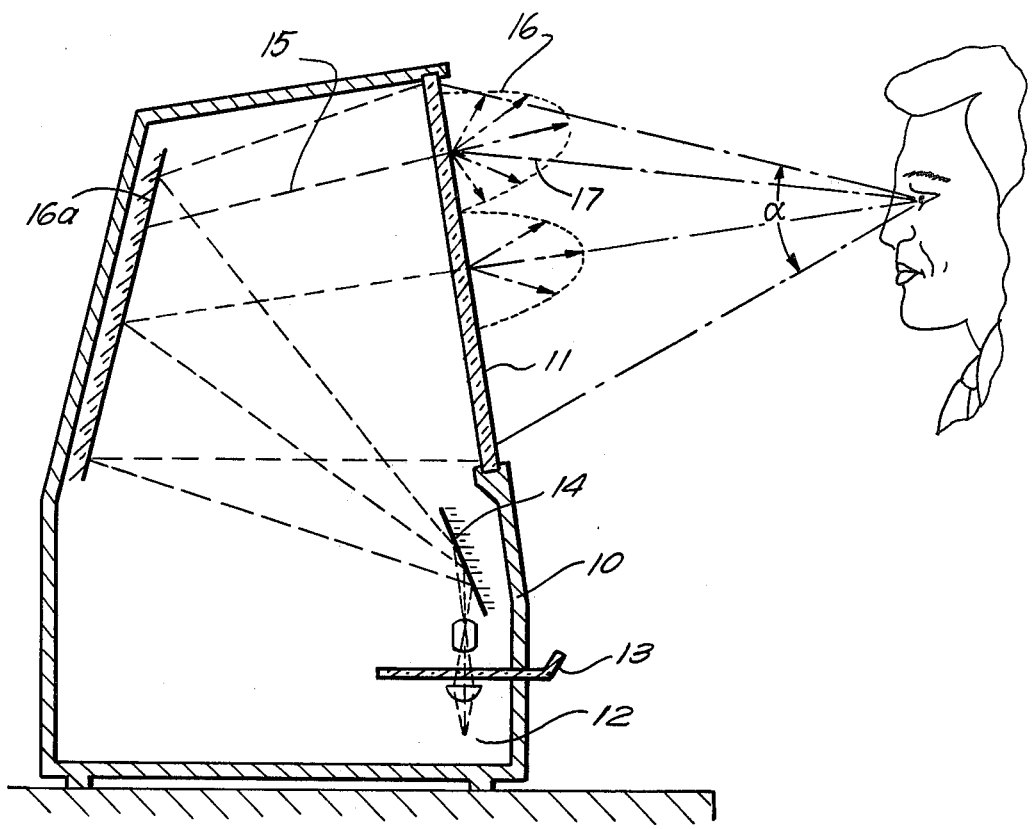

Referring first to FIG. 1 (prior art), the angle as seen by a viewing observer on a screen of a reading device 10 is designated by $\alpha$. A transparency to be observed is placed on a suitable carrier frame 13 is illuminated by a light source 12 and is projected via mirrors 14, 16a upon a projection screen 11 the outer surface of which is coated with a frosting which disperses a light ray 15 impinging upon the screen into a bundle 16 of light rays. As shown and is also evident, a light ray 17 in the bundle 16 which originates close to the margin of the screen appears to an observer shorter than a light ray originating at the midpoint of the screen.

As is evident the reading device 10 is bound to be rather voluminuous as the projection screen 11 must be at the eye level of an observer sitting in front of the device.

Figure 2:
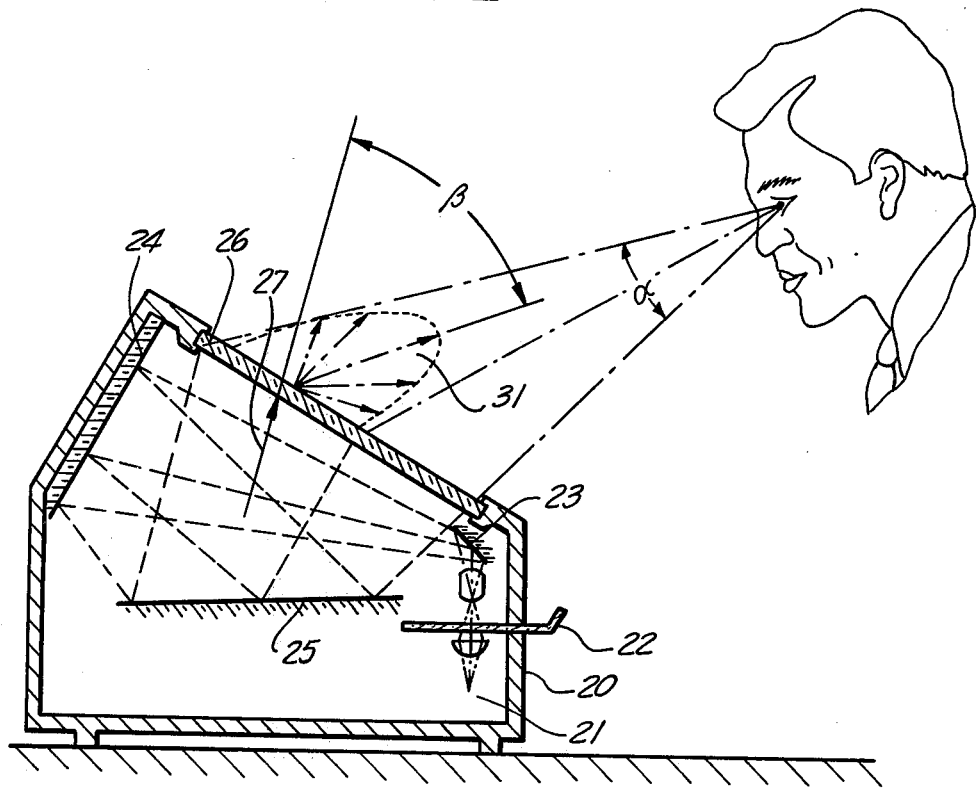
FIG. 2 shows a diagrammatic elevational view, partly in section, of a reading device according to the invention.

Referring now to FIG. 2 which shows a reading device 20 according to the invention, a source of light 21 is disposed below a picture frame or carrier 22 for illuminating a transparency or fiche placed upon the frame. The light rays passing through frame 22 and the transparency is deflected by mirrors or suitable prisms 23, 24 and 25 upon a projection screen 26. This screen may be more slanted than the screen in the reading device according to FIG. 1. As a result the reading device according to the invention is considerably more compact than the known device as shown in FIG. 1. The opening angle of the picture field as seen by an observer on the projection screen 26 is here also designated with α.

As it is now apparent, the reading device according to the invention is significantly improved over the known device shown in FIG. 1. The light rays as reflected by the optically second mirror 25 impinge upon the projection screen 26 at a right angle, but an observer placed opposite the projection screen sees the light rays emanating from mirror 25 at an angle.

A light ray 27 impinging upon the screen would generate due to the frosting of the surface of the screen. However, a light ray which would impinge in the viewing direction of the observer only with a very limited component. Such limited component is avoided by the optical arrangement shown in FIG. 3. While the front side of the projection screen 26, that is, the side viewed by the observer is coated with a smooth frosting layer 28, the back or opposite side of the screen mounts a number of prisms or glass wedges. These prisms or glass wedges are arranged in preferably parallel spaced apart lines or rows on the back side of the screens 26.

Figure 3:
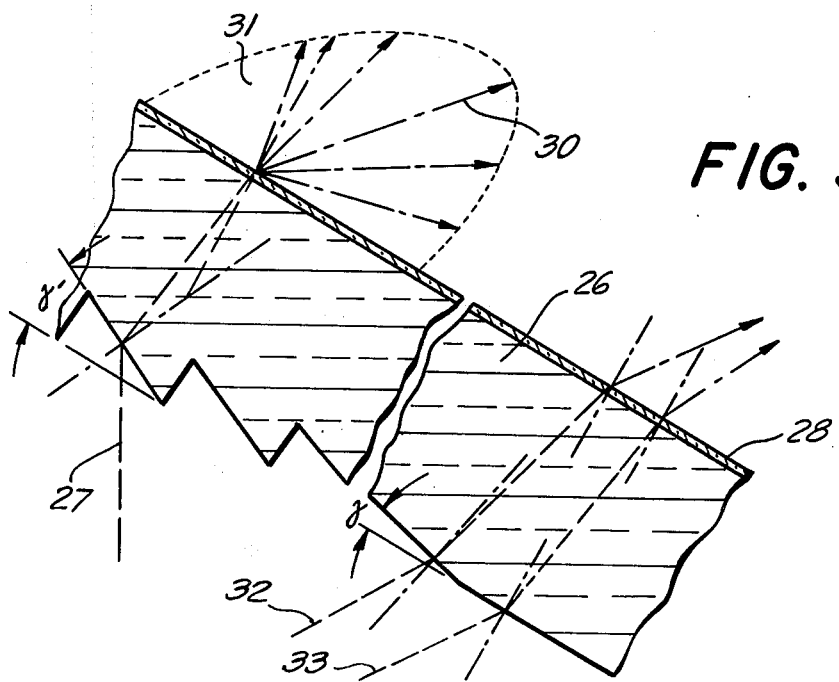
FIG. 3 shows a fragmentary enlarged view upon the screen part of the reading device as shown in FIG. 2.

As a result, the light ray 27 is deflected into the direction of the light ray 30, when emerging from the outer surface of the projection screen 26. Due to the frosting on the outside of the screen a bundle 31 of light rays is generated. As is shown, the central or principal component of this bundle of light rays is located within the open angle β, that is within the visual angle of the observer. To obtain such effect across the entire surface of the projection screen, the slant angle of the surfaces of the prisms or glass wedges relative to the plane of the screen are increased from the lower end of the screen toward the upper end along the length of the screen. FIG. 3 also shows clearly that the angle γ of the prism or wedge surface upon which a light ray 32 impinges is smaller than the angle γ' of the adjacent prism or wedge surface upon which the adjacent light ray 27 impinges. In the impinging range of the light ray 33 this angle γ equals or is close to zero.

As stated before, the prisms or glass wedges may be mounted on the side of the projection screen 26 opposed to the frosted surface thereof. This arrangement has the advantage that due to the frosting of the upper surface of the projection screen the edges of the screen are not visible to the eyes of the observer. Moreover, an arrangement of prisms, for instance, by providing additional plates having the prisms attached thereto is also possible. A multitude of very small prisms may also be used. However, due to the shiny surfaces of such small prisms an increased reflection of stray light upon the projection screen may occur.

A plate consisting for instance of a suitable foil which supports the prisms or glass wedges provided according to the invention as it is indicated in FIG. 3 by a dotted line.

The disposition of the prisms is preferably such that the components providing most of the light of each deflected light ray are within the view angle of the observer. As a result of such orientation of the light rays a uniform illumination of the entire or nearly entire frosted screen surface is obtained so that the observer need not to change the position of his head to any substantial extent when observing the screen picture.

Figure 4:
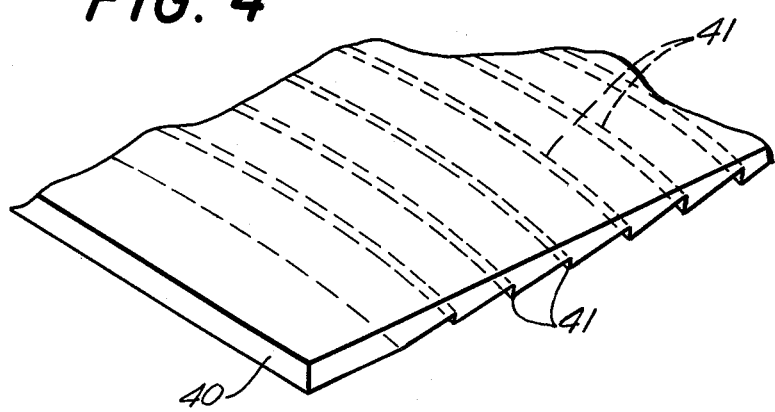
FIG. 4 is a fragmentary view of a modification of the screen of a reading device according to the invention.

As the eyes of the observer must follow each line appearing on the screen, it is advantageous to provide the most effective direction of the light rays. To obtain such optical orientation of the rays, it is advantageous to arrange the prisms 41 on the projector screen 40 in curved lines as is shown in FIG. 4. Prisms so arranged represent in effect part of a Fresnel-lens thereby producing the desired optical effect; to wit, the maximal yield of light and to read comfortably the letters or other formations on the screen without requiring a substantial and frequent movement of the head of the observer.

While the invention has been described in detail with respect to certain now preferred examples and embodiments of the invention, it will be understood by those skilled in the art, after understanding the invention, that various changes and modifications may be made without departing from the spirit and scope of the invention, and it is intended, therefore, to cover all such changes and modifications in the appended claims.

I claim:

1. A reading device for viewing microfilms, transparencies, fiches and the like, said device comprising: a plate-shaped projecion screen made of transparent material, said screen being inclined to the horizontal at an acute angle and having upper and lower ends and opposite sides, said screen having on one side a frosted surface, said surface constituting the viewing side of the screen; prism-shaped parts disposed on the opposite side of the projection screen; a source of light on said opposite side of the screen; a carrier for placing thereupon microfilms, transparencies and fiches to be projected; and a mirror assembly disposed to reflect rays of light from said source of light thorugh said prism-shaped parts upon and through said projection screen, said prism-shaped parts being disposed in lengthwise rows and having prism surfaces extending at an angle with respect to said opposite side of the projection screen for deflecting light rays reflected from the mirror assembly so as to project an image of the article placed on the carrier within an angle converging toward a viewer situated above and in front of the screen at an acute viewing angle with respect to said screen, said prism surfaces progressively increasing in angle with respect to the opposite side of the projection screen from the lower end of the screen whereat said angle is substantially zero toward the upper end of the screen whereat said angle is maximum to provide substantially uniform illumination within the visual angle of the observer.

2. The reading device according to claim 1 wherein said rows of prisms are parallel.

3. The reading device according to claim 2 wherein said rows of prisms are arranged along a curved line.

4. The reading device according to claim 3 wherein the curvature of said rows of prisms are curved similar to the curvature of a Fresnel-lens.

5. The reading device according to claim 1 wherein said rows of prisms are disposed on a plate attached to said other side of the projection screen.

6. The reading device according to claim 5 said plate mounting said rows of prisms in a foil.

7. The reading device according to claim 1 and comprising a frame structure, said projection screen, said source of light, said carrier and said mirror assembly being mounted on said frame, said projection screen being disposed on said frame structure in a position only slightly slanted relative to the horizontal.

8. The reading device according to claim 7 wherein said projection screen overlies said frame structure and has a horizontal component which represents substantially the entire horizontal extent of the frame structure.

* * * * *